Sept. 16, 1958    D. G. ROSE ET AL    2,852,652
HEAT WRENCH
Filed June 14, 1957

INVENTORS
D. G. ROSE
P. H. BOOTH
BY Maybee & Legris
ATTORNEYS

United States Patent Office 2,852,652
Patented Sept. 16, 1958

2,852,652

HEAT WRENCH

Desmond Griffith Rose, Toronto, Ontario, and Peter Harry Booth, Rexdale, Ontario, Canada, assignors to Orenda Engines Limited, Malton, Ontario, Canada, a corporation Application June 14, 1957, Serial No. 665,680

5 Claims. (Cl. 219—19)

This invention relates to a tool of the wrench type and, in particular, to a tool of this nature which will perform the dual function of heating and expanding a bolt or similar threaded member as well as tightening it into its co-operating screw threads.

The invention has particular application to the gas turbine industry and will be described in relation to a particular function which it is specifically adapted to perform.

In the assembly of gas turbine engines it is often necessary to join together two shafts in such a manner that no vibration or strain imposed upon the joined parts during engine operation will cause them to loosen or separate. To accomplish this purpose, the bolts or similar members are heated to expand them prior to insertion and permitted to contract and shrink after they have been tightened to further draw the joined members together.

It is, accordingly, an object of the present invention to provide a tool in which the dual operation of heating and tightening may be performed simultaneously without the use of more than one implement.

A preferred embodiment of the invention will be described with reference to the accompanying drawings in which.

Figure 1:
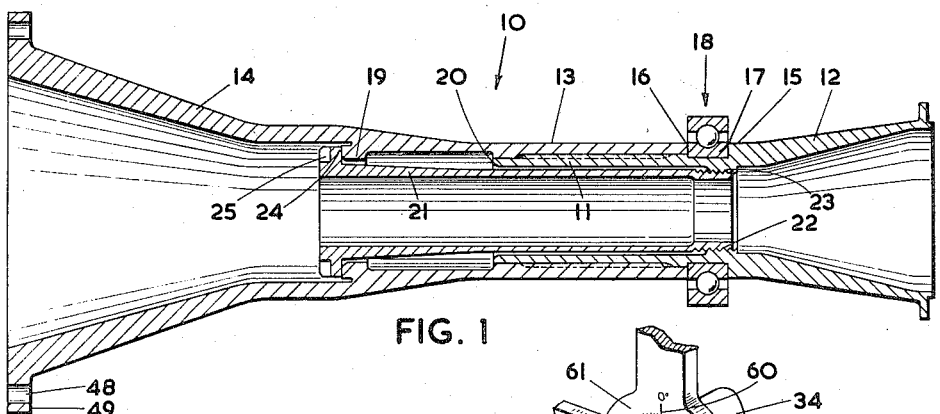
Figure 1 is an axial cross-section through a joint in the main shaft of a gas turbine engine.

Referring now to Figure 1 it will be seen that the joint structure of the gas turbine shaft which is indicated generally at 10 is effected by slipping one end 11 of a first tubular member 12 into the end 13 of a second tubular member 14. The first tubular member 12 is provided with a radially outwardly extending collar 15 on its outer surface against which the end 16 of the second tubular member 14 abuts. In the embodiment illustrated in Figure 1 the end 16 of the second tubular member 14 is separated from the collar 15 by means of the inner race 17 of a ball bearing assembly 18 but, of course, the effect is the same as if the end 16 of the tubular member 14 abutted directly against the collar 15.

The second tubular member 14 is provided with an inwardly extending radial collar 19 which, when the tubular members 12 and 14 are assembled as shown in Figure 1 is spaced from the end 20 of the first tubular member 12.

A third tubular member 21 fits within the assembled first and second tubular members 12 and 14 and is provided, at one end, with external screw threads 22 which co-operate with internal screw threads 23 on the first tubular member 12. The opposite end of the third tubular member 21 is provided with an outwardly extending radial flange 24 which constitutes a nut portion bearing a series of castellations 25 formed in its end face. It will be seen from Figure 1, accordingly, that if the third tubular member 21 is threaded into the first tubular member 12 the flange 24 will abut the collar 19 of the second tubular member 14 and will draw the first and second tubular members 12 and 14 together.

Normal tightening of the third tubular member 21 is insufficient to ensure that the vibration of the aircraft engine during operation will not cause loosening of this joint with the resultant damage to the engine as a whole. Accordingly, it is desired to further increase the tightening effect already described by expanding the third tubular member 21 by the application of heat and then, further threading the elongated third tubular member 21 into the first tubular member 12, and taking advantage of the contraction of the third tubular member 21, when it cools, to increase the force exerted thereby to hold the first and second tubular members 12 and 14 together.

Figure 2:
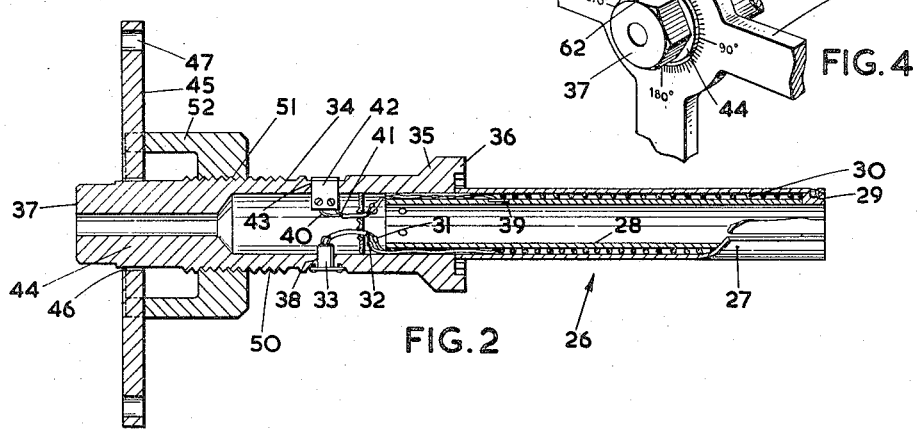
Figure 2 is an axial cross-section view of the tool which is the subject of the present invention.

Figure 2 illustrates a tool which is specifically designed to accomplish this purpose, the tool comprising a tubular element 26 of double-walled construction consisting of an outer wall 27 and inner wall 28 held in spaced apart relationship by means of a collar 29 extending radially outwardly from the outer surface of the inner wall 28. Between the inner and outer walls 27 and 28 of the tubular element 26 is coiled an electrical heating element 30 which is connected by electrical leads 31 and 32 to a terminal block 33 for connection with a source of electrical energy.

The tubular element 26 is received and held in a hollow shaft 34 which is provided, at one end, with a collar 35 surrounding the tubular element 26, the collar being formed at its end face with nut engaging projections 36 adapted to co-operate with the castellations 25 on the end face of the third tubular member 21 described with reference to Figure 1. The end of the shaft 34 remote from the collar 35 is formed at 37 to receive a wrench to enable the shaft and the collar 35 to be turned. The shaft 34, as mentioned above, is hollow and contains the electrical conduits 31 and 32 which lead to the terminal block 33 which is set in an aperture 38 in the wall of the hollow shaft.

A thermocouple 39 is positioned in association with the tubular element 26, preferably between the inner and outer walls thereof and is connected by means of electrical conduits 40 and 41 to a terminal block 42 which is also set in the wall of the hollow shaft 34 in an opening 43. By this means the thermocouple 39 may be connected to indicator means externally of the tool to give a reading of the temperature to which the third tubular member 21 has been heated.

In view of the fact that the flange 24 on the third tubular member may be positioned some distance inside the bore of the second tubular member 14, it is essential that some means be provided to maintain the end 44 of the shaft 34 in coaxial alignment with the third tubular member 21 during the time that torque is applied to it to tighten the third tubular member 21 into threaded engagement with the first tubular member 12. If such means were not provided strain would be imposed upon the tubular element 26 which might result in damage to the tool.

Figure 3:
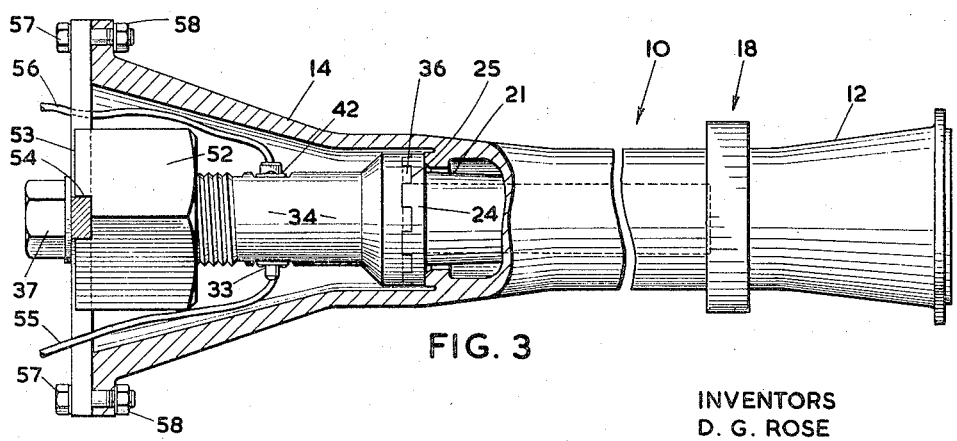
Figure 3 is a partly cut away side elevation view of the tool of Figure 2 in position in a shaft structure similar to Figure 1.

To accomplish this end a spider 45 is provided with a central aperture 46 through which the end 44 of the shaft 34 may pass. The aperture 46 is a rotating fit about the end 44 of the shaft 34 which, at this point, is cylindrical for rotation in the aperture 46. The ends of the arms of the spider 45 may conveniently be provided with bolt holes 47 to enable it to be secured, as shown in Figure 3, to the end of the second tubular member 14 which, in most aircraft constructions is also provided with a series of holes 48 in a radially outwardly extending flange 49. If the second tubular member 14 is not provided with holes 48 in a flange 49, other suitable means such as clamps of various types may be used to secure the spider 45 in position relative to the second tubular member 14 to prevent radial and axial displacement of the spider relative to the second tubular member 14.

In order to ensure that the nut engaging means 36 on the collar 35 are constantly in engagement with the castellations 25 on the flange 24 of the third tubular member 21, means are provided to advance the tool at the same rate as the third tubular member 21 is threaded into engagement with the first tubular member 12. In the embodiment shown, these means comprise a threaded portion 50 on the external surface of the shaft 34 which are engaged by internal threads 51 on a bearing block 52 which is threadably mounted on the shaft 34. The end face 53 of the bearing block 52 is provided with notches 54 to receive the arms of spider 45 to prevent rotation of the bearing block 52 relative to the shaft 34. Thus, it will be seen, that when the device is assembled as shown in Figure 3 rotation of the formed portion 37 of the shaft 34 by a wrench will cause the shaft 34 to advance towards the third tubular element 21. The pitch of the threads 50 and 51 is, of course, formed identical to the pitch of threads 22 and 23 so that the rate of advance of the tool into the bore of the second tubular member 14 is identical to the rate of advance of the third tubular member 21 into the bore of the first tubular member 12.

Referring now to Figure 3 the device may be seen in position in an assembly similar to that shown in Figure 1 with the nut engaging members 36 in engagement with the castellations 25 in the end face of flange 24 of the third tubular member 21. The terminal blocks 33 and 42 are connected to a source of electrical energy and indicator means respectively by means of electrical conduits 55 and 56 respectively.

In order to assemble the devices shown in Figure 3 the bearing block 52 is threaded towards the end 44 of the shaft 34 with the collar 35 in engagement with the flange 24 of the third tubular member 21 until the spider 45, when positioned as shown in Figure 3, seats in the notches 54 of the bearing block 52. Bolts 57 are then inserted through holes 47 in the spider and 48 in the flange 49 of the second tubular member 14 and nuts 58 are applied to hold the spider in position.

The third tubular member 21 is then threaded into the first tubular member 12 as far as is possible with the application of a predetermined torque to the portion 37.

Figure 4:
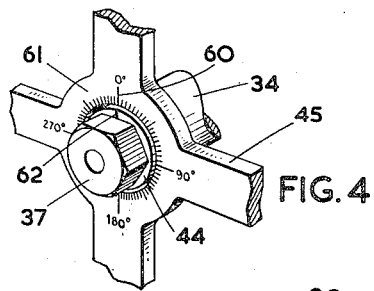
Figure 4 is a detailed perspective view of the end face of the tool of Figure 2.

The heating element 30 is then connected to a source of electrical energy to heat the tubular member 21 so as to longitudinally expand it and permit it to be further threaded into the first tubular member 12. The thermocouple 39 is connected to indicator means by electrical conduit 56 and when the indicator means give a reading to show that a predetermined temperature has been reached which will produce the desired elongation of the third tubular member 21, a wrench is applied to the portion 37 of the shaft 34 and the third tubular member 21 is threaded into the first tubular member 12 in its elongated state. Fine regulation of the extent to which the third tubular member 21 is threaded into the first tubular member 12 may be obtained by means of graduations 60 scribed on the exposed face 61 of the spider 45 and a reference mark 62 on the portion 37 of shaft 34. Since the pitch of the threads 22 is known the axial distance through which the third tubular member will move can be determined by the extent of its angular rotation. This can be easily determined by the graduations 60 and the reference mark 62 (see Figure 4). When the desired position has been reached nuts 58 are removed from bolts 57 and the spider is extracted and the tool withdrawn from its position within the assembly which is allowed to cool thereby permitting the third tubular member 21 to contract to firmly draw the first and second tubular members 12 and 14 together in a rigid and stable manner.

What we claim as our invention is:

1. A tool for tightening an assembly including a first tubular member having a radially outwardly extending collar on its outer surface adjacent its end, a second tubular member adapted to slip over the end of the first tubular member and abut the collar, a radially inwardly extending collar on the inner surface of the second member which is separated from the end of the first member when the two tubular members are assembled, a third tubular member adapted to fit within the first and second tubular members and to engage the first member by cooperating screw threads on the inner surface of the first member and the outer surface of the third member and to engage the collar on the second member by an outwardly extending flange constituting a nut portion on the end of the third member remote from the screw threads to draw the first and second members together when the third member is threaded into the first member, comprising: a tubular element slidable into the bore of the third member, a heating device within the tubular member to heat and longitudinally expand the third member, a nut engaging collar surrounding the tubular element and adapted to engage the nut portion on the end of the third member when the tubular member is in the bore of the third member, means to rotate the nut engaging collar, means to maintain the tool in coaxial alignment with the bore of the third member and means to advance the tool at the same rate as the third member is threaded into the bore of the first member.

2. A tool for tightening an assembly including a first tubular member having a radially outwardly extending collar on its outer surface adjacent its end, a second tubular member adapted to slip over the end of the first tubular member and abut the collar, a radially inwardly extending collar on the inner surface of the second member which is separated from the end of the first member when the two tubular members are assembled, a third tubular member adapted to fit within the first and second tubular members and to engage the first member by cooperating screw threads on the inner surface of the first member and the outer surface of the third member and to engage the collar on the second member by an outwardly extending flange constituting a nut portion on the end of the third member remote from the screw threads to draw the first and second members together when the third member is threaded into the first member, comprising: a tubular element slidable into the bore of the third member, a heating device within the tubular member to heat and longitudinally expand the third member, a nut engaging collar surrounding the tubular element and adapted to engage the nut portion on the end of the third member when the tubular element is in the bore in the third member, the nut engaging collar being integral with a shaft coaxial with the tubular element, the shaft having its end remote from the nut engaging collar formed to receive a wrench to turn the shaft, means surrounding the shaft and rotatable relative thereto to maintain the shaft coaxial with the third member and means to advance the tool at the same rate as the third member is threaded into the first member.

3. A tool for tightening an assembly including a first tubular member having a radially outwardly extending collar on its outer surface adjacent its end, a second tubular member adapted to slip over the end of the first tubular member and abut the collar, a radially inwardly extending collar on the inner surface of the second member which is separated from the end of the first member when the two tubular members are assembled, a third tubular member adapted to fit within the first and second tubular members and to engage the first member by cooperating screw threads on the inner surface of the first member and the outer surface of the third member and to engage the collar on the second member by an outwardly extending flange constituting a nut portion on the end of the third member remote from the screw threads to draw the first and second members together when the third member is threaded into the first member, comprising: a double-walled tubular element slidable into the bore of the third member, an electrical heating device between the two walls of the tubular element to heat and longitudinally expand the third member, a nut engaging collar surrounding the tubular element and adapted to engage the nut portion on the end of the third member when the tubular element is in the bore in the third member, the nut engaging collar being integral with a shaft coaxial with the tubular element, the shaft having its end remote from the nut engaging collar formed to receive a wrench to turn the shaft, means surrounding the shaft and rotatable relative thereto and adapted to co-operate with the second member to maintain the shaft of the tool coaxial with the third member and means to advance the tool at the same rate as the third member is threaded into the first member.

4. A tool for tightening an assembly including a first tubular member having a radially outwardly extending collar on its outer surface adjacent its end, a second tubular member adapted to slip over the end of the first tubular member and abut the collar, a radially inwardly extending collar on the inner surface of the second member which is separated from the end of the first member when the two tubular members are assembled, a third tubular member adapted to fit within the first and second tubular members and to engage the first member by co-operating screw threads on the inner surface of the first member and the outer surface of the third member and to engage the collar on the second member by an outwardly extending flange constituting a nut portion on the end of the third member remote from the screw threads to draw the first and second members together when the third member is threaded into the first member, comprising: a double-walled tubular element slidable into the bore of the third member, an electrical heating device between the two walls of the tubular element to heat and longitudinally expand the third member, a nut engaging collar surrounding the tubular element and adapted to engage the nut portion on the end of the third member when the tubular element is in the bore in the third member, the nut engaging collar being integral with a hollow shaft coaxial with the tubular element, the shaft having its end remote from the nut engaging collar formed to receive a wrench to turn the shaft, and terminal means fitted in the shaft to connect the heating element to a source of electrical energy, means surrounding the shaft and rotatable relative thereto adapted to co-operate with the second member to maintain the shaft of the tool coaxial with the third member and means to advance the tool at the same rate as the third member is threaded into the first member.

5. A tool for tightening an assembly including a first tubular member having a radially outwardly extending collar on its outer surface adjacent its end, a second tubular member adapted to slip over the end of the first tubular member and abut the collar, a radially inwardly extending collar on the inner surface of the second member which is separated from the end of the first member when the two tubular members are assembled, a third tubular member adapted to fit within the first and second tubular members and to engage the first member by co-operating screw threads on the inner surface of the first member and the outer surface of the third member and to engage the collar on the second member by an outwardly extending flange constituting a nut portion on the end of the third member remote from the screw threads to draw the first and second members together when the third member is threaded into the first member, comprising: a double-walled tubular element slidable into the bore of the third member, an electrical heating device between the two walls of the tubular element to heat and longitudinally expand the third member, a temperature responsive element associated with the tubular element and connected to indicator means externally of the tool to give a reading of the temperature to which the third member has been heated, a nut engaging collar surrounding the tubular element and adapted to engage the nut portion on the end of the third member when the tubular element is in the bore in the third member, the nut engaging collar being integral with a hollow shaft coaxial with the tubular element, the shaft having its end remote from the nut engaging collar formed to receive a wrench to turn the shaft, and terminal means fitted in the shaft to connect the heating element to a source of electrical energy, means surrounding the shaft and rotatable relative thereto adapted to co-operate with the second member to maintain the shaft of the tool coaxial with the third member and means to advance the tool at the same rate as the third member is threaded into the first member.

References Cited in the file of this patent

UNITED STATES PATENTS

| Number | Name | Date |
|---|---|---|
| 1,458,956 | Sayer | June 19, 1923 |
| 1,839,850 | Hodgkinson | Jan. 5, 1932 |
| 2,176,601 | Bates | Oct. 17, 1939 |
| 2,306,709 | Miller | Dec. 29, 1942 |
| 2,611,066 | Freeman | Sept. 16, 1952 |
| 2,717,300 | Tyne | Sept. 6, 1955 |